United States Patent [19]
Olson et al.

[11] 3,992,655
[45] Nov. 16, 1976

[54] ELECTRONIC METER SIGNALLING DEVICE

[75] Inventors: Jack E. Olson, Lakewood; Lyle D. Frey; Robert S. Nevin, both of Denver, all of Colo.

[73] Assignee: Dieterich Standard Corporation, Boulder, Colo.

[22] Filed: Sept. 16, 1974

[21] Appl. No.: 506,508

[52] U.S. Cl. ............................. 317/123; 317/148.5 B
[51] Int. Cl.² ...................................... H01H 47/00
[58] Field of Search ............ 317/123, 148.5 R, 149, 317/148.5 B, 157, 132, 133.5, 146, DIG. 2; 340/258 C

[56] References Cited
UNITED STATES PATENTS

| | | | |
|---|---|---|---|
| 1,861,929 | 6/1932 | Lowry | 317/146 X |
| 2,138,593 | 11/1938 | Breitenstein | 317/146 X |
| 2,234,895 | 3/1941 | Cerveny et al. | 340/258 C |
| 2,540,728 | 2/1951 | Hansen et al. | 317/146 X |
| 2,647,252 | 7/1953 | Moore, Jr. | 317/146 X |
| 2,907,932 | 10/1959 | Patchell | 317/148.5 R |
| 2,935,661 | 5/1960 | Quick | 317/148.5 R |
| 3,012,730 | 12/1961 | Coogan | 317/146 X |
| 3,643,134 | 2/1972 | Beling | 317/148.5 R |

FOREIGN PATENTS OR APPLICATIONS 1,078,855   11/1954   France ................. 317/146

*Primary Examiner*—Harry Moose
*Attorney, Agent, or Firm*—Edwin L. Spangler, Jr.

[57] ABSTRACT

This electronic meter signalling device provides a means for converting a conventional meter or gauge into an electronic switch in which a number of electronic outputs indicative of conditions of the meter or gauge are provided. The meter signalling device comprises a capacitive coupling means used in conjunction with an indicator of the meter or gauge to form electric charge coupling paths at a number of predetermined scale conditions of the instrument. Electronic circuitry transmits a signal through each electric charge coupling path to a discriminating circuit to activate outputs indicative of the scale conditions of the instrument.

8 Claims, 5 Drawing Figures

ELECTRONIC METER SIGNALLING DEVICE

BACKGROUND OF THE INVENTION

This invention relates to electronic signalling and indicating devices, and more particularly, to such devices employed in conjunction with a meter or instrument to provide electronic outputs indicative of meter conditions.

In many applications it is desirable to have electric signal indications of the condition of a conventional, mechanical-movement meter. For example, certain devices monitored by a meter are required to operate within limits, generally high and low limits. Should the device fall outside of the desired limits, it is necessary to provide an indication of this undesirable condition. This is most easily accomplished by an electronic switch which activates a preventative or alarm device. Furthermore, it is often desirable to monitor the condition of a meter from a long distance, such as with remote and automatic control applications where visual readings are impossible. In these situations, it is necessary to provide an electrical communication link to indicate the meter condition.

Most conventional meters are designed for providing only visual indications. Since these types of meters are unsatisfactory for many of the foregoing applications, it is necessary that additional apparatus be incorporated to provide electrical indications. Such apparatus should be easily adaptable to a conventional instrument. Since many instrument movements are of a delicate mechanical design, and thereby easily affected by external forces, the apparatus should not apply any force to the meter movement so as to give false or inaccurate readings. It is also desirable that the meter signalling apparatus have provisions for providing a plurality of outputs, since it is often desirable to monitor a number of different operating conditions. To accomplish this multiple condition monitoring, the electronic circuitry should be as simple as possible, and should make use of conventional power sources to simplify use of the device. Accordingly, it is a general object of this invention to provide an electronic meter signal which achieves the foregoing requirements.

It is an object of this invention to provide an electronic meter signalling device which may be combined with a conventional mechanical indicating instrument.

It is an object of this invention to provide an electronic meter signalling device which does not adversely affect the indications or operation of a mechanical indicating instrument.

It is another object of this invention to provide an electronic meter signalling device which provides at least one additional signal other than those signals provided at different operating conditions of the conventional instrument.

It is a further object of this invention to provide an electronic meter signalling device of simple construction which employs a conventional power supply to simplify its combination with a conventional mechanical instrument.

To achieve these and other objects, a preferred embodiment of the invention comprises a capacitive coupling means retained adjacent the scale of a conventional mechanical-movement meter or gauge and an electronic discriminating circuit used in conjunction with the capacitive coupling means. The capacitive coupling means employs an indicator of the instrument to form a capacitive-coupled link between limit electrode means and the electronic discriminating circuitry. A capacitive link causes no forces, inaccuracies, or false readings to be introduced into the movement of the instrument. Various limit electrode means are positioned at preselected points along the scale of the instrument and as the indicator comes in proximity with each limit electrode means, an electric signal is transmitted from the limit electrode means through the indicator to the electronic circuitry. The electronic circuitry distinguishes each of these introduced signals and provides outputs indicative of the preselected conditions of the indicator. Furthermore, the electronic circuitry distinguishes between the signals generated and provides additional outputs indicative of other conditions of the instrument.

BRIEF DESCRIPTION OF THE DRAWINGS

A complete understanding of the invention may be had by referring to the accompanying detailed description of the invention and drawings in which.

DETAILED DESCRIPTION OF THE INVENTION

Figure 1:
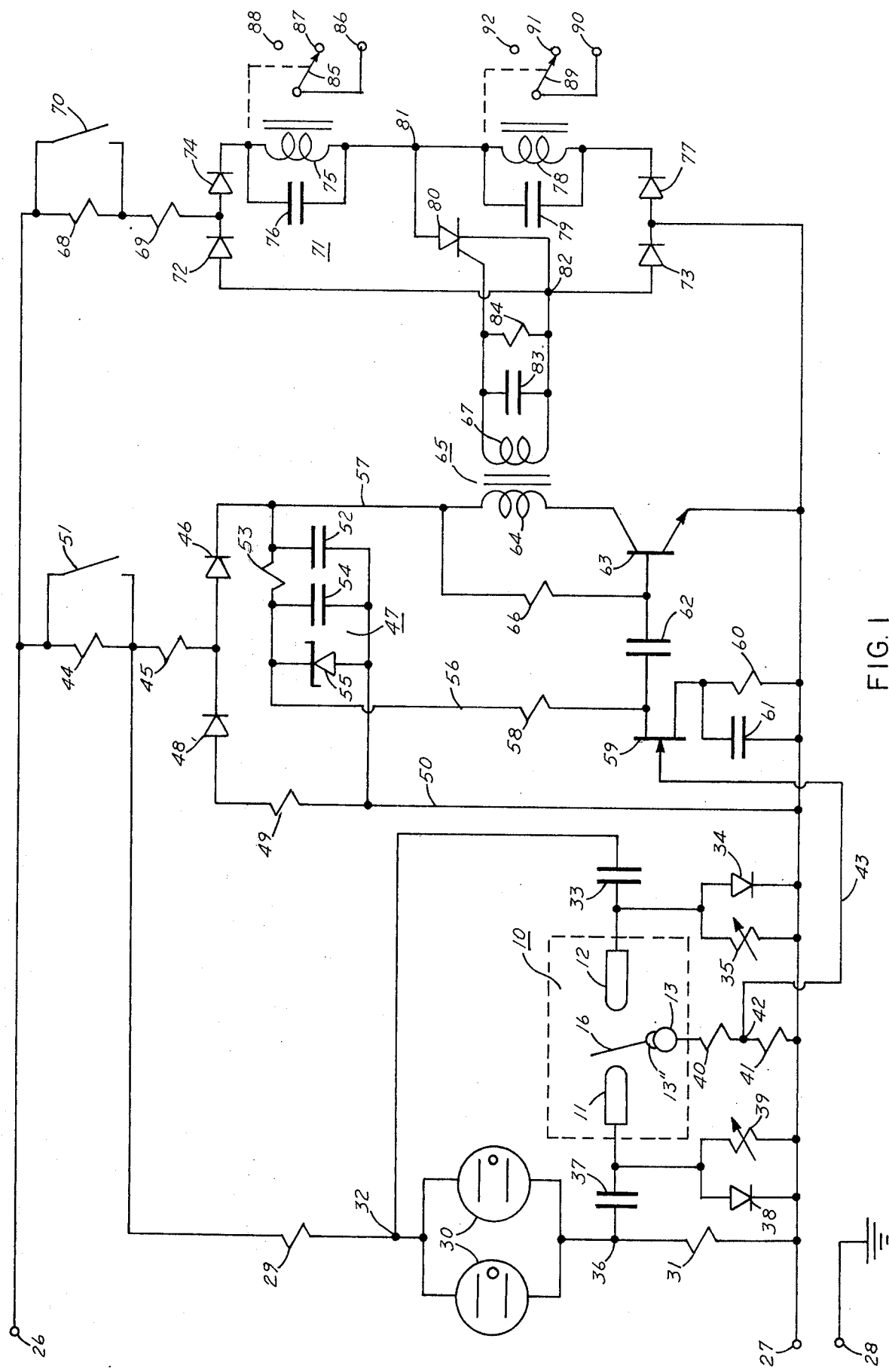
FIG. 1 is a circuit diagram of a preferred embodiment of the present invention.

The invention illustrated in FIG. 1 includes, in addition to electronic circuitry, a capacitive coupling means 10 including a first limit electrode means 11, a second limit electrode means 12, and a pickup electrode 13. The capacitive coupling means 10 is adapted to be connected to or retained adjacent to a scale of a meter or gauge having an indicator. The indicator exhibits electrical properties and may include a transmitter electrode 13″ attached thereto. This is better illustrated in FIGS. 2 and 3.

Figure 2:
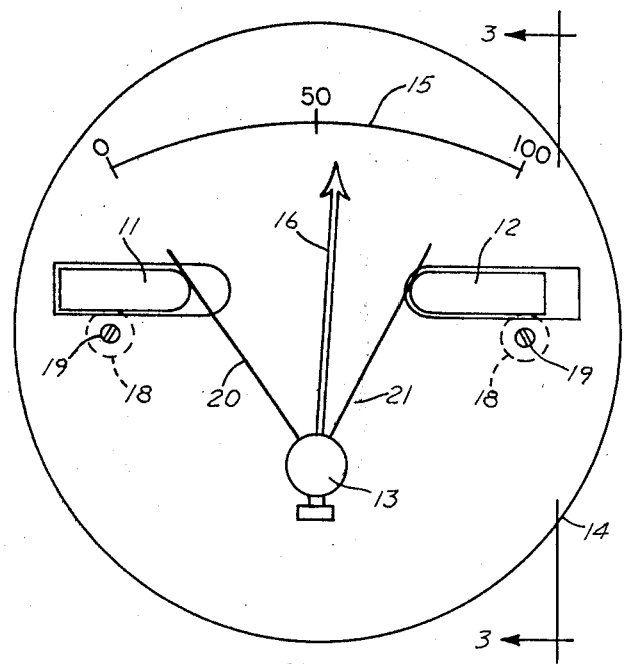
FIG. 2 is a front view of a meter or instrument incorporating a portion of the present invention.
Figure 3:
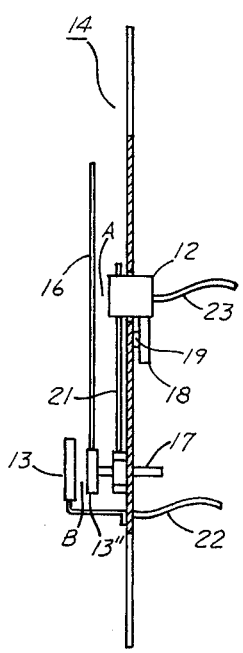
FIG. 3 is a partial side view of FIG. 2.

Referring now to FIGS. 2 and 3 where the same numerals are used to reference the same elements, a meter or instrument 14 having a scale 15 is shown. A meter vane or indicator 16 is rotated by axle 17 to provide the indication dictated by the movement of the internal mechanism (not shown) of the meter or instrument 14. The indicator 16 and the attached transmitter electrode 13″ are metals or other substances which exhibit electrical properties, such as the ability to conduct current and the ability to absorb and transmit electric charge. The first and second limit electrode means 11 and 12, respectively, are retained or held adjacent the face of the instrument 14 and caused to move in a transverse manner by adjustment wheels 18. Each adjustment wheel 18 has, for example, a screw driver slot 19 to rotate its wheel 18 and thereby adjust the lateral position of each limit electrode means. Limit pointers 20 and 21 extend from the axle 17 to the first and second limit electrode means 11 and 12, respectively. As will be discussed subsequently, the limit pointers 20 and 21 physically indicate predetermined points on the scale 15 at which certain signal outputs from the invention are provided. The pickup electrode 13 is retained adjacent the point where indicator 16 connects to the axle 17 in juxtaposition to transmitter electrode 13''. The pickup electrode 13 is electrically insulated from the face of the instrument 14, and is connected by a conductor 23 to the electronic discriminating circuitry to be described later. The first and second limit electrode means also are electrically insulated from the face of the instrument 14, and each has an electrical conductor connecting it to the electronic circuitry. One such exemplary conductor 23 connected to the second limit electrode means 12 is illustrated.

In operation, the capacitive coupling means forms a plurality of non-conductive coupling paths for electric charge flow. For example, electric charge is supplied over conductor 23 to the second limit plate 12. Should the instrument be monitoring a condition in which the indicator 16 has moved to the right of the limit pointer 21, the indicator 16 will be proximate the second limit electrode means 12. Such proximity is illustrated by the gap A in FIG. 3. The charge supplied by conductor 23 is transmitted in the form of electric charge flow from the second limit electrode means 12 across gap A to the indicator 16, thereby defining a coupling path. The electrical properties of the indicator 16 are such as to cause the charge induced across gap A to be conducted to the transmitter electrode 13''. The charge is then transmitted between the transmitter electrode 13'' and the pickup electrode 13 across the gap B, and this charge is conducted over conductor 22. When the indicator 16 falls between the limit pointers 20 and 21, no significant electric charge flows from either limit electrode means 11 or 12 to the pointer 16. If the indicator 16 falls to the left of the limit pointer 20, a similar electric charge coupling path is provided between the conductor connected to the first limit electrode means 11 and conductor 22.

From the foregoing description of elements and operation of the capacitive coupling means, it can readily be seen that the elements employed are of a simple nature and may be readily added to a conventional instrument 14 without significant modification of that instrument. Furthermore, the use of capacitive coupling paths for the electric charge flow requires no mechanical contact to the indicator 16 or to the mechanism of the instrument 14. Thus, the capacitive coupling paths eliminate adverse effect on the instruments performance such as that which might result from contact or external forces.

Figure 4:
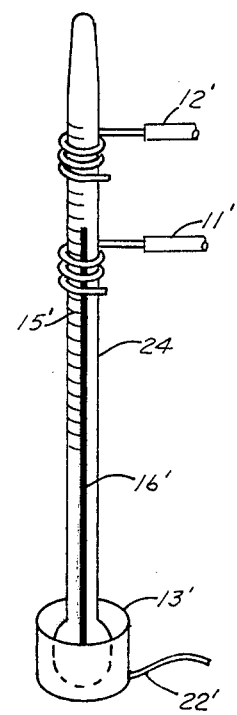
FIG. 4 is a perspective view of an alternative form of meter or instrument incorporating a portion of the present invention; and, FIG. 5 is a graph of voltage waveforms present at various points in the circuit illustrated in FIG. 1.

It is contemplated that the capacitive coupling means described may be used with a wide variety of instruments. For example, in FIG. 4 there is shown a thermometer 24 having a scale 15' and an indicator 16' which may comprise a column of mercury. At points along the scale 15' are first and second limit electrode means 11' and 12', respectively, which in this case are in the form of conductors surrounding thermometer 24. Pickup electrode 13' surrounds the base of the thermometer and conductor 22' is connected to the pickup electrode 13'. As the column of mercury rises and comes in proximity with the first limit electrode means 11', electric charge is induced between the limit electrode means 11' to the column of mercury. The charge is conducted to the base of the thermometer where it is received at the pickup electrode 13' and transmitted to the associated circuitry described subsequently by the conductor 22'. A similar result occurs when the column of mercury comes in proximity with the second limit electrode means 12'. Thus, it can be seen that this use of the capacitive coupling means is similar to that described in FIGS. 2 and 3.

Referring back to FIG. 1, with the foregoing description of the capacitive coupling means 10, discriminating electronic circuitry comprising the remainder of the preferred embodiment of the invention will now be described. Alternating current in the form of a conventional AC power supply is supplied to the circuit at terminals 26 and 27. Terminal 28 is for connection to a neutral of the power supply. Connected in series across terminals 26 and 27 is a resistor 29, two gas tubes 30 connected in parallel, a resistor 31 and a resistor 44. The gas tubes 30 may be, for example, neon tubes which exhibit voltage hold-off characteristics before flashing over and becoming conductive with a negligible internal impedance. Two gas tubes are employed for redundance, thereby increasing reliability. Junction 32 between resistor 29 and tubes 30 is connected by means of a capacitor 33 to the second limit electrode means 12. Connected between the second limit electrode means 12 and terminal 27 are a diode 34 and a variable resistor 35. The diode 34 is poled so as to conduct positive pulses from capacitor 33 to the terminal 27. Junction 36 between tubes 30 and the resistor 31 is connected by a capacitor 37 to the first limit electrode means 11. Connected between the first limit electrode means 11 and the terminal 27 are a diode 38 and a variable resistor 39. The diode 38 is poled so as to conduct positive pulses transmitted by capacitor 37 to the terminal 27. Resistors 40 and 41 connected in series between the pickup electrode 13 and terminal 27 provide a means for producing a voltage at junction 42 when electric charge flows from the pickup electrode 13 through the resistors 40 and 41.

Figure 5:
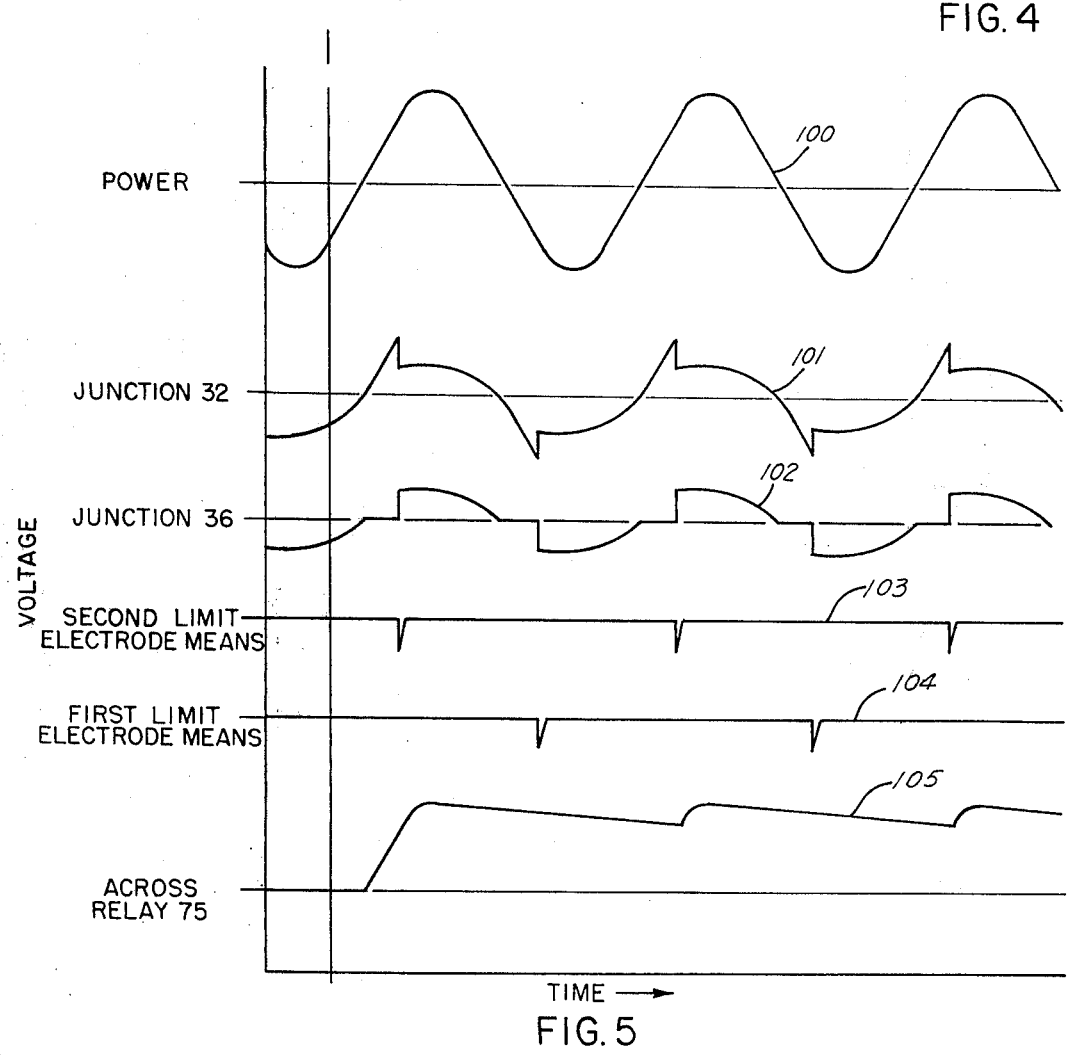

With the aid of the graphs of FIG. 5, the operation of the capacitive coupling means 10 and the portion of the circuit thus far described will be described. Graph 100 in FIG. 5 illustrates the conventional AC voltage waveform applied to terminals 26 and 27. During the positive portion of the waveform 100 terminal 26 experiences a more positive voltage than that experienced at terminal 27. As the voltage continues to increase in magnitude between terminals 26 and 27, a voltage sufficient to cause flashover of the tubes 30 is attained. At flashover a step-like decrease in voltage is experienced at junction 32 as current begins to flow through resistor 29. Similarly, a step-like increase in voltage occurs at junction 36 as the current flows through resistor 31. The voltage appearing at junctions 32 and 36 are shown by the waveforms 101 and 102, respectively, in FIG. 5. The step-like decrease in voltage at junction 32 causes a negative spike to be transmitted to the second limit electrode means 12, as a result of the differentiation network formed by capacitor 33 and variable resistor 35. The adjustment of resistor 35 determines the magnitude of the negative pulse transmitted to the second limit plate 12. Diode 34 is poled so as to not conduct negative pulses to terminal 27. The negative pulse transmitted to the second limit electrode means 12 is illustrated as graph 103 in FIG. 5. The positive going increase of voltage at junction 36 causes a positive spike as a result of the differentiation network formed by capacitor 37 and variable resistor 39. However, the positive spike is conducted by diode 38 to the terminal 27 and thus no spike of electrical energy is applied to the first limit electrode means 11.

Consider now that the AC waveform continues in its cycle such that terminal 27 becomes more positive than terminal 26 as is illustrated by negative half-cycles of the AC power graph 100 in FIG. 5. At the point when tubes 30 flash over, a step-like increase in voltage occurs at point 32 and a step-like decrease in voltage occurs at point 36. The step-like increase at point 32 is a result of the current flowing through resistor 29 toward terminal 26, and this current causes the voltage at point 32 to go from more negative to less negative thus forming the step-like increase in voltage. The step-like decrease in voltage at point 36 is a result of current flowing from terminal 27 through resistor 31 causing the voltage to decrease at point 36. The positive step voltage at junction 32 is reflected as a positive voltage spike by the differentiation network comprised of capacitors 33 and 35, but the diode 34 conducts this positive voltage to terminal 27 and no voltage appears at the second limit electrode means 12. The step-like decrease in voltage at junction 36 is reflected as a negative spike as a result of the differentiation network comprised of capacitor 37 and resistor 39. Diode 38 blocks the negative spike and allows it to be transmitted to the first limit electrode means 11. The negative spike is illustrated as graph 104 in FIG. 5.

From the foregoing description of operation, it can readily be understood that a negative spike is supplied to the second limit electrode means 12 during each positive half-cycle of the power supplied to terminals 26 and 27, and a negative spike is supplied to the first limit electrode means 11 during each negative half-cycle of the AC waveform. These relationships are illustrated in graphs 100, 103, and 104 of FIG. 5.

Assume now that a coupling path exists between either the first or second limit electrode means and the indicator 16 of the capacitive coupling means 10. Electric charge caused by the negative spike induces a current flow through resistors 40 and 41 which causes a negative voltage to appear at junction 42 and on conductor 43. Thus, whenever the indicator of the instrument comes in proximity of the first or second limit electrode means 11 and 12, respectively, an electrical signal is provided on conductor 43. This electrical signal is referenced to either the positive or negative half-cycle of the applied power as previously described. For example, should the indicator 16 fall within proximity of the first limit electrode means 11, an electrical signal will be present on conductor 43 only during negative half-cycles of applied power; and if the indicator 16 is in proximity of the second limit electrode means 12, the signal on conductor 43 is present only during positive half-cycles of applied power.

When terminal 26 is positive with respect to terminal 27, current flows through resistors 44 and 45 and diode 46 all connected in series to a DC power supply illustrated generally at 47. Under these conditions, diode 48 blocks the flow of current through resistor 49 to terminal 27 by means of conductor 50. A switch 51 may be closed to short out resistor 44 when a low voltage AC power supply is connected across terminals 26 and 27, for example, a 110 volt power supply instead of a 220 volt supply. The power supply 47 comprises a capacitor 52, a resistor 53, a capacitor 54, and a zener diode 55. The capacitors 52 and 54 store energy and resistor 53 is a series discharge resistor for reducing the ripple in the DC power supply voltage. Zener diode 55 provides a stable positive voltage on conductor 56. A positive voltage is also supplied on conductor 57. When terminal 27 becomes more positive than terminal 26, current flows through conductor 50, resistor 49 and diode 48, and if switch 51 is open, this current also flows through the voltage divider comprising resistors 44 and 45. The voltage divider supplies the proper operating voltage for the combination of resistors 29 and 31 and tubes 30 during the negative half-cycles of applied voltage. Resistor 49 is selected such that it dissipates the equivalent voltage of the power supply 47 and other associated circuit elements supplied thereby during positive half-cycles of applied power, that is when terminal 26 is positive with respect to terminal 27.

The positive voltage on conductor 56 is supplied through a resistor 58 to the drain of a field effect transistor (FET) 59. The source of the FET 59 is connected by a resistor 60 to terminal 27, and a bypass capacitor 61 is connected in parallel with the resistor 60. The gate of FET 59 is connected to conductor 43. Capacitor 62 couples the drain of FET 59 to the base of transistor 63. The emitter of transistor 63 is connected to terminal 27, and a winding 64 of transformer 65 connects the collector of transistor 63 to the conductor 57. Resistor 66 connected between the conductor 57 and the base of transistor 63 provides bias current for transistor 63.

In operation, a quiescent current flows through resistors 58 and 60 as a result of the normal, non-biased operation of FET 59. Signals appearing on conductor 43 are negative due to the negative spikes induced in the first and second limit electrode means 11 and 12 as previously described. The negative signal appearing on the gate of FET 59 immediately causes it to cease conducting and a pulse is transmitted through capacitor 62 to the base of transistor 63. This pulse to the base of transistor 63 causes a pulse of amplified current magnitude to flow through winding 64 thus inducing current in winding 67 of transformer 65. Thus, it can be seen that upon each occurrence of a negative spike being transmitted by the capacitive coupling means 10, a current is induced in winding 67 of the transformer 65.

In the remainder of the circuit in FIG. 1 comprising an output triggering means or switch, resistors 68 and 69 are connected in series to terminal 26, and a switch 70 may be used to short resistor 68 whenever switch 51 is closed. An electronic bridge illustrated generally at 71 is connected by resistors 68 and 69 between the terminals 26 and 27. Diodes 72 and 73 form two legs of the bridge 71. Diode 74 connected in series with the parallel combination of a relay coil 75 and storage capacitor 76 form a third leg of the bridge. Diode 77 connected in series with the parallel combination of the relay coil 78 and storage capacitor 79 form the last leg of the bridge. An SCR 80 having its anode connected to junction 81 and its cathode connected to junction 82 forms a conductive path through the midpoint junctions 81 and 82 of the bridge so as to render the bridge 71 operative. The winding 67 of transformer 65 is connected between the cathode and gate of the SCR 80, and capacitor 83 and resistor 84 are connected in parallel between the gate and cathode of SCR 80 to protect the gate from high voltages.

The electronic bridge 71 and its associated elements operate as follows. When terminal 26 is positive with respect to terminal 27 and SCR 80 has been triggered by a potential induced winding 67, current flows through the following series path consisting of elemens 68, 69, 74, 75, 80, and 73. When terminal 27 is positive with respect to terminal 26 and SCR 80 has been triggered by a potential induced in the coil 67, current flows through the electronic bridge in a series path consisting of the following elements 77, 78, 80, 72, 69, and 68. In each situation the elements of the bridge 71 block the current flow in the path other than that described. When current flows through relay coil 75, the contactor 85 is caused to move from terminal 87 to terminal 88. Upon the termination of the current through the relay winding 75, the contactor 85 returns to terminal 87. Thus, a relay output is formed by the connection of terminals 86 and 87 in one case and the connection of terminals 86 and 88 in the other case. When current flows through relay coil 78, contactor 89 is caused to move from terminal 91 to terminal 92. Similarly, a relay output connecting terminals 90 and 91 is formed in one instance and a relay output formed by connecting terminals 90 and 92 in another instance are provided.

The operation of the invention described in FIG. 1 will now be described in conjunction with the waveforms of FIG. 5. Assume that the indicator 16 has come in proximity to the second limit electrode means 12. A negative signal appears on the conductor 43 and is simultaneously amplified by the FET 59 and transistor 63 and transmitted through transformer 65 to trigger the SCR 80. As previously described, the capacitive coupling means 10 only transmits signals from the second limit electrode means 12 during positive half-cycles of applied power, as can be seen from FIG. 5. During the positive half-cycle of applied power relay 75 is conductive due to the triggered condition of SCR 80, again as previously described. Thus, an output consisting of closure of terminals 86 and 88 is provided whenever electric charge flows in the second coupling path of the capacitive coupling means 10. So long as the indicator 16 stays in proximity of the second limit electrode means 12 the relay output formed by connecting junctions 86 and 88 is present, due to the storage capacitor 76 storing enough energy to hold the relay coil 75 conductive between successive positive half-cycles, and this is shown by graph 105 in FIG. 5.

Now assume that the indicator 16 changes to the proximity of the first limit electrode means 11 and a first coupling path is formed. A negative signal during negative half-cycles of applied power causes the SCR 80 to be triggered. During the negative half-cycle, current flows through relay coil 78 thus changing the relay output from the connection of terminals 90 and 91 to the connection of terminals 90 and 92. So long as the indicator stays in proximity of the first limit electrode means 11, a relay output connecting terminals 90 and 92 is provided due to the storage capacitor 79 holding the relay coil 78 conductive between successive negative half-cycles.

Assume that indicator 16 is between the first and second limit electrode means. In this condition no significant electric charge flows through through the capacitive coupling means and no signal is present on conductor 43. Since no signal is present on conductor 43, no triggering potential is applied to the SCR 80 and the bridge remains non-conductive. In this condition, neither relay coil 75 or 78 is conductive, and the outputs consist of the connection of terminals 86 and 87 and the connection of terminals 90 and 91.

From the foregoing discussion of the capacitive coupling means it can be seen that the present invention may be used simply without significant modification of a conventional instrument. The capacitive coupling means does not affect the meter movement so as to cause inaccurate readings. The electronic circuitry is easily used in conjunction with the commercially available alternating current supplies which also adds to the ease of incorporating the circuitry with a conventional meter. Furthermore, the circuit as described provides at least three output indications from a single source of power without the necessity of employing complex multiplexing devices to divide the signal for various indicating functions.

Although a single embodiment of the electronic meter signal has been shown and described, those skilled in the art will perceive changes and modifications without departing from the invention. Therefore, it is intended by the appended claims to cover all such changes and modifications as fall within the true spirit and scope of the invention.

What is claimed is:

1. A meter signal for use with an instrument having a pivotally mounted meter vane exhibiting electrical properties, comprising:
   capacitive coupling means operatively connected to the instrument and positioned with respect to the pivot of the meter vane to form first and second separate and discrete capacitive coupling paths for transmission of electrical charge flow when formed including said vane at selected positions thereof; and,
   distinguishing means connected in circuit relation with the first and second coupling paths to provide a first output when an electrical charge flows in the first coupling path, a second output when an electrical charge flows in the second coupling path, and a third output when no significant electrical charge flows in either the first or second coupling paths.

2. The meter signal recited in claim 1 wherein the capacitive coupling means further includes at least one prepositioned limit electrode means for each of the paths.

3. The meter signal as recited in claim 1 wherein the capacitive coupling means includes a first limit electrode means connected in and forming a part of the first coupling path and a second limit electrode means connected in and forming a part of the second coupling path.

4. The meter signal as recited in claim 3 wherein the position each of the coupling electrode means is adjustable in relation to the instrument.

5. A meter signal for use with an instrument having a meter vane exhibiting electrical properties, comprising:
   capacitive coupling means adapted to be connected to the instrument and to be used in conjunction with the meter vane to form first and second coupling paths for transmission of electrical charge flow when formed, the first and second coupling paths respectively including first and second limit electrode means connected therein; and,
   distinguishing means connected in circuit relation with the first and second coupling paths to provide a first output when elecrical charge flows in the first coupling path, a second output when electrical charge flows in the second coupling path, and a third output when no significant electrical charge flows in the first or second coupling paths; said distinguishing means further including:
   means for switching energy alternately to the first and second limit electrode means; and,
   means for activating the first output coincidentally with the flow of electric charge in the first coupling path and for activating the second output coincidentally with the flow of electric charge in the second coupling path.

6. The meter signal as recited in claim 5 wherein the means for activating the first and second outputs further includes:
    an amplifier for providing a trigger signal when activated by the flow of electric charges in the first or second coupling paths;
    a first output relay switch for providing the first output when activated;
    a second output relay switch for providing the second output when activated; and
    a trigger switch connected to the amplifier for activating either the first or second relay switch upon receiving the trigger signal.

7. Apparatus for converting an instrument, which has a scale and a pivotally mounted movable electrically conductive indicator, into a meter relay, comprising:
    capacitive coupling means adapted to be positioned adjacent the pivot of the indicator to form an electrical charge coupling path between the capacitive coupling means and the indicator and a limit electrode means positioned at each of a predetermined number of points on the scale;
    means for supplying energy to the capacitive coupling means to provide a signal at each of the predetermined points on the scale when a corresponding electrical charge coupling path is formed therebetween, and the limit electrode means via the indicator; and
    means for utilizing each signal to produce an output and for discriminating between each signal to provide at least one more output than the predetermined number of points on the scale.

8. A method for providing a plurality of output indications indicative of conditions of an instrument which has a scale along which a pivotally mounted electrically conductive indicator moves, comprising the steps of:
    retaining a capacitive coupling means adjacent the pivot of the indicator;
    providing a plurality of spaced electrode means adjacent the scale for forming a plurality of electric charge coupling paths between the capacitive coupling means and the spaced electrode means via the indicator at a predetermined number of points on the scale;
    generating a signal when each electrical charge coupling path is formed;
    discriminating among the signals generated; and,
    activating outputs indicative of points on the scale and of at least one additional condition of the instrument.

* * * * *